US012739345B2

(12) United States Patent
Mazer et al.

(10) Patent No.: US 12,739,345 B2
(45) Date of Patent: Sep. 15, 2026

(54) METHODS AND SYSTEMS FOR ENHANCED CONFERENCING

(71) Applicant: COMCAST CABLE COMMUNICATIONS, LLC, Philadelphia, PA (US)

(72) Inventors: Natalie Mazer, Philadelphia, PA (US); Arpit Mathur, Philadelphia, PA (US); Hamed Nazari, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 211 days.

(21) Appl. No.: 18/068,124

(22) Filed: Dec. 19, 2022

(65) Prior Publication Data

US 2024/0205366 A1 Jun. 20, 2024

(51) Int. Cl.

| | |
|---|---|
| ***H04N 7/15*** | (2006.01) |
| ***G06F 3/01*** | (2006.01) |
| ***H04L 12/18*** | (2006.01) |
| ***H04N 7/14*** | (2006.01) |

(52) U.S. Cl.

CPC ............. *H04N 7/152* (2013.01); *G06F 3/013* (2013.01); *H04L 12/1822* (2013.01); *H04N 7/147* (2013.01)

(58) Field of Classification Search

CPC ..... H04N 7/152; H04N 7/147; H04L 12/1822

See application file for complete search history.

(56) References Cited

U.S. PATENT DOCUMENTS

| | | | | |
|---|---|---|---|---|
| 8,451,994 | B2 | 5/2013 | Abuan et al. | |
| 10,459,985 | B2 | 10/2019 | Shepherd et al. | |
| 2014/0229866 | A1 | 8/2014 | Gottlieb | |
| 2016/0255126 | A1* | 9/2016 | Sarris | H04L 65/1096 348/14.08 |
| 2019/0027165 | A1* | 1/2019 | Togawa | G10L 25/06 |
| 2021/0144336 | A1 | 5/2021 | Van Os et al. | |
| 2022/0400022 | A1* | 12/2022 | Desai | G06V 40/107 |

* cited by examiner

*Primary Examiner* — Amal S Zenati

(74) *Attorney, Agent, or Firm* — Ballard Spahr LLP

(57) ABSTRACT

Methods, systems, and apparatus are described herein for enhanced conferencing. A computing device monitor user participation. The computing device may modify conferencing parameters based on the user participation. By monitoring device and user participation, modifying conferencing parameters may be aimed at increasing or decreasing participation by a user or users.

20 Claims, 7 Drawing Sheets

100
COMPUTING DEVICE 101
CONFERENCE APPLICATION 102
AUDIO ANALYSIS MODULE 103
VIDEO ANALYSIS MODULE 104
INTERFACE MODULE 105
NETWORK 106
USER DEVICE 110A
AUDIO MODULE 111A
IMAGE MODULE 112A
COMMUNICATION MODULE 113A
USER DEVICE 110B
AUDIO MODULE 111A
IMAGE MODULE 112A
COMMUNICATION MODULE 113A

210

212

211

213

214

Amplitude

Attack Decay Sustain Release

Time

220

230

Attack Decay Time that the key is held Release

Sustain

METHODS AND SYSTEMS FOR ENHANCED CONFERENCING

BACKGROUND

During meetings, especially video conferencing, where normal social cues may not be as readily evident, participants may become frustrated by a perceived inability to participate due to, for example, dominance of another participant. For example, a participant may find it difficult to speak up or otherwise participate because other participants are dominating the meeting by speaking a disproportionate amount.

SUMMARY

It is to be understood that both the following general description and the following detailed description is merely an example and is explanatory only and is not restrictive. Methods, systems, and apparatuses for enhanced conferencing are described. Conference participation levels associated with one or more users may be determined based on video data and audio data associated one or more user devices. Based on the conference participation levels, one or more output parameters of interface elements associated with the conference may be adjusted to encourage or discourage participation by one or more users. For example, the interface element may be repositioned to a less prominent part on a screen, the interface element may be reduced in size, or the interface element may be removed from an area of the screen. Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles.

DETAILED DESCRIPTION

Figure 1:
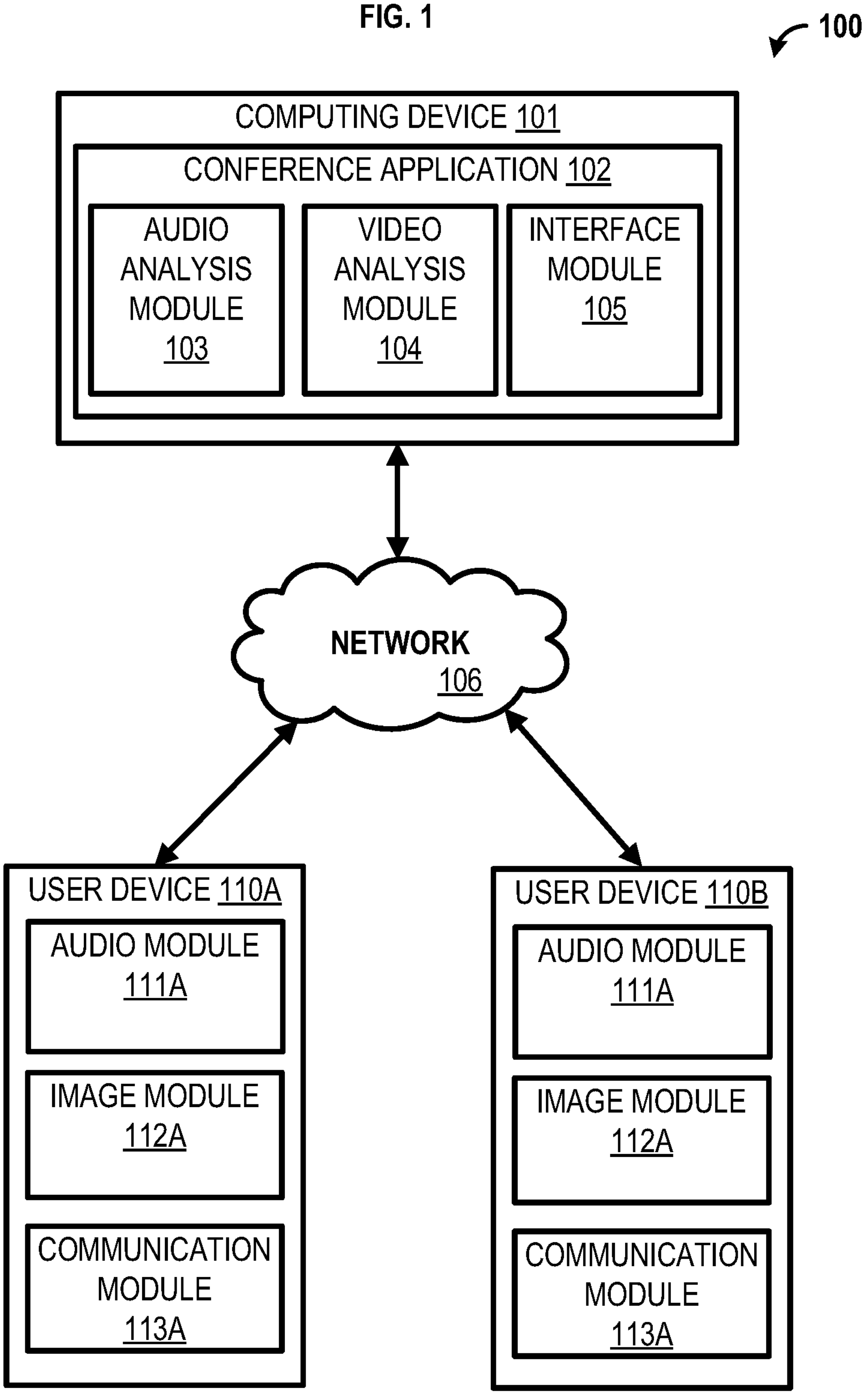
FIG. 1 is a block diagram of an example system and network.

Before the present techniques are disclosed and described, it is to be understood that this disclosure is not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" or "example" means "an example of" and is not intended to convey an indication of a preferred or ideal embodiment. "Such as" is not used in a restrictive sense, but for explanatory purposes.

Disclosed are components that can be used to perform the disclosed content analysis and storage techniques. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present systems and methods may be understood more readily by reference to the following detailed description of preferred embodiments and the examples included therein and to the Figures and their previous and following description.

As will be appreciated by one skilled in the art, the content analysis and storage techniques may take the form of an entirely hardware embodiment, an entirely software embodiment, or an embodiment combining software and hardware aspects. Furthermore, the content analysis and storage techniques may take the form of a computer program product on a computer-readable storage medium having computer-readable program instructions (e.g., computer software) embodied in the storage medium. More particularly, the present content analysis and storage techniques may take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example system 100 in which the present methods and systems may operate. One skilled in the art will appreciate that provided herein is a functional description and that the respective functions can be performed by software, hardware, or a combination of software and hardware. The system 100 may facilitate enhanced conferencing.

The system 100 may comprise a computing device 101, a network 106, and one or more user devices 110A-B. The one or more user devices 110A-B may be configured to communicate with each other and/or with the computing device 101 through the network 106. While only user devices 110A-B are shown, it is to be understood the system 100 may comprise any number of user devices. Likewise, while only a single computing device 101 is shown, it is to be understood that the system 100 may comprise any number of computing devices.

The network 106 may comprise any telecommunications network such as the Internet or a local area network. Other forms of communications can be used such as wired or wireless telecommunication channels, for example. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The computing device 101 may comprise a computer, a server, a laptop, a smart phone, or the like. The computing device 101 may be configured to send, receive, generate, store, or otherwise process data. The computing device 101 may comprise a conference application 102. The conference application 102 may comprise an audio analysis module 103, a video analysis module 104, and an interface module 105.

The one or more user devices 110A-B may comprise one or more computers, laptops, smartphones, or other user devices. Each user device of the one or more user devices 110A-B may be associated with one or more user device identifiers. The one or more user device identifiers may comprise a string of letters, numbers, characters, or the like. For example, the one or more user device identifiers may comprise one or more media access control (MAC) addresses. The one or more user device identifiers may indicate (e.g., be associated with) one or more user accounts. The one or more user accounts may be subscription accounts, paid accounts, or the like. For example, a first user device 110A of the one or more user devices may be associated with a first user device identifier and a second user device 110B of the one or more user devices may be associated with a second user device identifier of the one or more user device identifiers.

Each user device of the one or more user devices 110A-B may comprise (e.g., be configured with) an audio module 111, an image module 112, and a communication module 113. With respect to each device and module, the audio module 111 may be configured to detect, receive, or otherwise determine an audio input and determine audio data. For example, the audio input may comprise a user speaking or some other noise. The audio module may comprise, for example, a microphone. The audio module may be configured to determine audio data associated with the audio input. The audio data may comprise amplitude, frequency, pitch, timbre, timing data, combinations thereof, and the like.

The video module 112 may configured to detect, receive, or otherwise determine a video input and determine video data. For example, the video input may comprise a video or other video data captured by an image capture device (e.g., a camera) associated with the user device. The audio module may be configured to determine video data associated with the video input. The video data may comprise motion data, lighting data, facial detection data, facial recognition data, object detection data, object recognition data, combinations thereof, and the like.

The communication module 113 may be configured for multi-device communication sessions. The communication module 113 may be configured to send and/or receive audio data and video data. For example, the communication module 113 may be configured to send data to and receive data from the computing device 101.

The conference application 102 may be configured to interface, for example through one or more Application Program Interfaces (APIs), with one or more applications and/or programs. For example, the conference application 102 may be configured to interface with and/or otherwise interact with the one or more underlying applications and/or one or more share applications. The one or more underlying application may comprise one or more native applications hosted on the user device 110A and/or 110B and/or the one or more applications may comprise browser-based applications hosted on a remote computing device.

The computing device 101 may be in communication with the one or more user devices 110A-B via the network 106. The computing device 101 may send and receive to and from the one or more user devices 110A-B via the network 106. For example, the computing device 101 may receive data from the communication module 113 of each user device of the one or more user devices 110A-B. The audio analysis module 103 may send, receive, store, generate, analyze, or otherwise process audio data received from the one or more user devices 110A-B. The audio analysis module 103 may be configured to determine an audio interruption event. For example, the audio analysis 103 may receive first audio data indicative of a first voice input received by the first user device 110A. The first audio data may comprise timing information indicating when the first voice input started. The audio analysis module may determine a first audio envelope associated with the first voice input.

The audio envelope may indicate how a sound changes over time. It may relate to elements such as amplitude (volume), frequencies (with the use of filters), pitch and timing data. The audio envelope may comprise one or more characteristics. For example, the audio envelope may comprise an attack, a decay, a sustain, and a release. The attack is the time taken for initial run-up of level from nil to peak and indicates the beginning of a voice input. For example, the attack may indicate the initial phase of a voice input received from a user device of the one or more user devices. The decay is the time taken for the subsequent run down from the attack level to the designated sustain level. For example, the decay may indicate a subsequent phase of the voice input wherein the voice input may decrease in energy towards a sustained speaking level. The sustain is the level during the main sequence of the sound's duration (e.g., the command) and may comprise the bulk the voice input. The release is the time taken for the level to decay from the sustain level to zero and indicates the end of the audio.

The audio analysis module may subsequently receive second audio data indicating a second voice input received by the second user device 110B. The second audio data may comprise second timing data. It may be determined, based on the second timing data, that the second voice input was received during the first voice input. The audio analysis module 103 may determine a second audio envelope associated with the second voice input. The audio analysis module 103 may determine an interruption event if the second voice input occurs during the first voice input. For example, the audio analysis module 103 may determine the interruption event if the second voice input begins during any of the attack, decay, or sustain of the first audio envelope.

Based on determining the interruption event, the interface module 105 may adjust one or more output parameters associated with one or more interface elements. The one or more output parameters may be associated with either or both of the first interface element associated with the first user device and/or a second interface element associated with the second user device. The one or more output parameters of a given interface element associated may be adjusted based on the second voice input occurring during the first voice input. The one or more output parameters may be adjusted based on any received input, including motion from a user. Adjusting the one or more output parameters of an interface element associated with the second user device may comprise changing one or more of: a size associated with the interface element, color associated with the interface element, a position of the interface element, a border associated with the interface element or any other characteristic or quality of the interface element.

For example, it may be determined that the second voice input interrupted the first voice input. An output parameter of the interface element associated with the second user device may be adjusted to discourage participation (e.g., discourage future interruptions). For example, the interface element associated with the second user device may be positioned less prominently on the screen, reduced in size, or changed in some way so as to direct attention away from the second user interface element. One or more notifications may be sent to either or both of the user devices 110A-B. The one or more notifications may be output via the one or more user devices 110A-B. The one or more notifications may comprise one or more messages, one or more icons, combinations thereof, and the like. For example, the one or more notifications may be sent to the user device 110A indicating that a user of the user device 110B was the interrupter. Similarly, a notification may be sent to the user device 110B indicating that the user of 110B interrupted.

The activity analysis module 104 may send, receive, store, analyze, generate, or otherwise process video data received from the one or more user devices 110A-B. The video data may be captured by an image capture component of the one or more user devices 110A-B. For example, the first user device 110A may comprise a first video camera (e.g., as part of a laptop, smartphone, etc. . . . ) and the second user device 110B may comprise a second video camera. The one or more user devices 110A-B may send the first video data and the second video data to the computing device 101 via the network 106. The computing device 101 may receive the first video data and the second video data. Based on the first video data, the activity analysis module 104 may determine one or more of a first activity event and/or a first activity level associated with the first user device 110A. Based on the second video data from the second user device 110B, the activity analysis module 104 may determine one or more of a second activity event or a second level associated with the second user device. For example, an activity event may comprise a motion indication indicative of a user motion within a field of view of a user device. For example, the motion indication may be determined by comparing one or more frames of video and determining, based on pixel comparison, a motion between two or more frames of video of the one or more frames of video. For example, the first motion event may be a user waving his or her hands. For example the motion event may be a user entering or exiting a field of view of a given image capture device. For example, a motion event may comprise a user nodding his head, shaking his head, or any other motion. Any of the one or more motion events (e.g., the first motion event and/or the second motion event) may be compared to a motion threshold.

The activity analysis module 105 may determine, based on a type of motion event, an adjustment to the one or more output parameters associated with the one or more interface elements. For example, a hand waving may cause an interface element to be highlighted or positioned more prominently. For example, a user entering a field of view of an image capture device may cause an interface element to be repositioned to a prominent area of a display (e.g., a central portion as opposed to a peripheral or boundary portion). Similarly, a user entering the field of view or waving his hand may cause the interface element to be resized to a larger size. For example, a user exiting the field of view may cause the user interface element to be repositioned to a less prominent area of the display. Similarly, the user exiting the field of view may cause the interface element to be resized to a smaller size.

The motion threshold may comprise a quantity of changes in pixel value over time. For example, the motion threshold may comprise a minimum number of pixels that must change value (e.g., from light to dark or dark to light) in order to satisfy the motion threshold. The motion threshold may be any threshold. If a motion event is detected that does not satisfy the threshold, the motion event may be ignored. In this manner, the activity analysis module may filter intentional and unintentional user motions. For example, a first motion event may comprise a user associated with the first user device waving his or her hand. Based on detecting a motion event, the interface module may adjust the one or more output parameters as described herein.

The activity analysis module 105 may be configured to determine one or more activity levels associated with the one or more user devices (e.g., associated with video feeds originating from, users thereof, etc.). The one or more activity levels may be determined based on the video data and/or the audio data. The one or more activity levels may indicate how much a given user is participating in the communication session.

For example, the activity levels may comprise a percentage of time a first user spends speaking during the conference. The activity analysis module 105 may compare for example, based on one or more audio envelopes, speaking time data with an overall communication session length and determine the percentage of time the first user spent speaking during the conference.

The one or more activity levels may be compared to one or more activity thresholds. For example, it may be determined that a first user's participation does not satisfy a first activity threshold. The first activity threshold may comprise a minimum threshold indicating a required participation level. For example, the first threshold may require 10% speaking time. It may be determined that the first user has only spoken for 4% of the conference and therefore her activity level does not satisfy the first activity threshold.

Based on the first activity level not satisfying the first activity threshold, the interface module may adjust one or more output parameters associated with one or more interface elements of the conference. An output parameter of the interface element associated with the first user device may be adjusted to encourage participation. For example, the interface element associated with the first user device may positioned prominently on the screen, enlarged, or changed in some way so as to direct attention to the first user interface element. For example, a colored outline (e.g., green) may be displayed around the interface element associated with the first user to indicate to both the first user and other users that the first user should be speaking more. For example, one or more graphics may be displayed (e.g., a microphone icon, or a small image of a person speaking) may be displayed to encourage the first user to speak more. For example, the microphone icon may turn green or glow or pulse to encourage the first user to speak more. Additionally and/or alternatively, one or more notifications may be sent to the first user and/or any other user(s) to alert the participants that the first user should be speaking more.

For example, a second threshold may prohibit greater than 90% speaking time. It may be determined that the second user has spoken for 95% of the conference and therefore her activity level satisfies the second activity threshold.

Based on the second activity level satisfying the second activity threshold, the interface module may adjust one or more output parameters associated with one or more interface elements of the conference. An output parameter of the interface element associated with the second user device may be adjusted to discourage participation. For example, the interface element associated with the second user device may positioned less prominently on the screen, reduced in size, or changed in some way so as to direct attention away from the second user interface element. For example, a colored outline (e.g., red) may be displayed around the interface element associated with the second user to indicate to both the second user and other users that the second user should be speaking less. For example, one or more graphics may be displayed (e.g., a microphone icon, or a small image of a person speaking) may be displayed to discourage the second user from speaking. For example, the microphone icon may turn red or glow or pulse to discourage the second user from speaking. Additionally and/or alternatively, one or more notifications may be sent to the second user and/or any other user(s) to alert the participants that the second is dominating the communication session and should speak less. Similarly, the second user may be muted if their participation exceeds the threshold.

Similarly, the audio analysis module may determine a quantity of times the first user was interrupted by another user. Similarly, the audio analysis module may determine a quantity of times the first user interrupted another user (e.g., an indication of the interruption event and an indication of whether the first user was the interrupted user, or the user interrupting). The quantity of interruption events and status as interrupter and/or the interrupted may be compared to one or more interruption thresholds. For example, it may be determined that a first user has interrupted a second user 10 times during the conference. The interruption threshold may be set to 5 and thus, the number of times the first user interrupted the second user satisfies the threshold.

Based on the number of times the first user has interrupted the second user satisfying the threshold, an output parameter of the interface element associated with the first user device may be adjusted to discourage participation. For example, the interface element associated with the second user device may positioned less prominently on the screen, reduced in size, or changed in some way so as to direct attention away from the second user interface element. Other actions such as sending messages, alerts, enabling or disabling one or more functions of the conference associated with a user are also contemplated.

The one or more interruption thresholds may comprise an interrupted threshold (e.g., an indication of how many times a user has been interrupted). For example, the first user may interrupt the second user 10 times and a third user also interrupts the first user 5 times. The interrupted threshold may be set to 12 times. Based on a determination that a quantity of times a given user has been interrupted satisfies the interrupted threshold, one more output parameters may be adjusted to encourage participation of the second user (the user who is frequently interrupted). For example, the interface element associated with the first user device may positioned prominently on the screen, enlarged, or changed in some way so as to direct attention to the first user interface element.

Figure 2A:
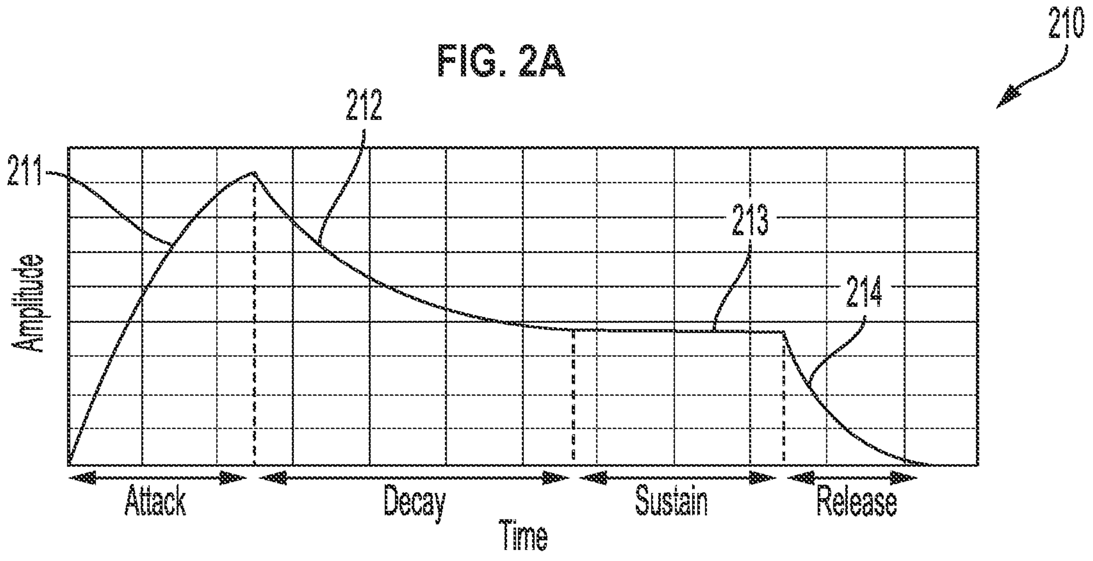
FIGS. 2A-2D show example audio envelopes.
Figure 2B:
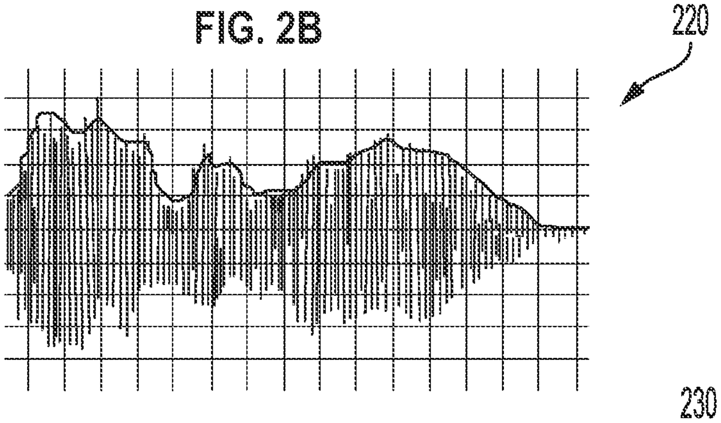
Figure 2C:
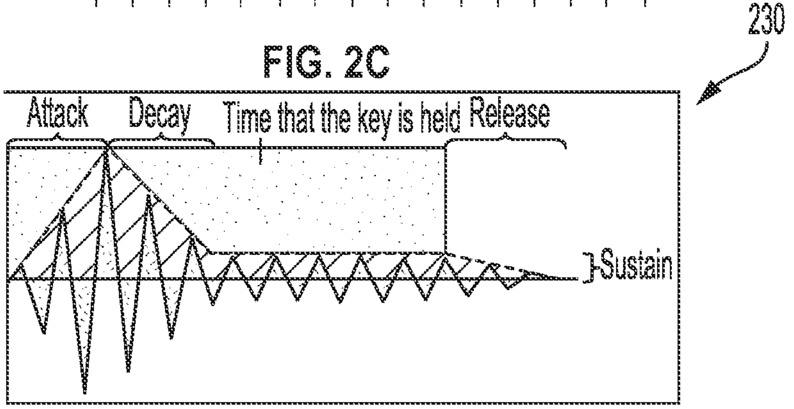
Figure 2D:
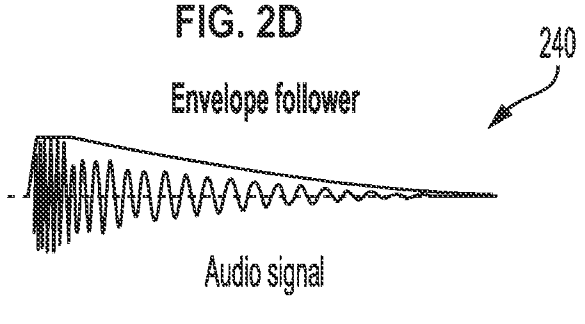

FIGS. 2A-2D show example audio envelopes. FIG. 2A shows an example audio envelope 210. The audio envelope 210 may indicate how a sound changes over time. It may relate to elements such as amplitude (volume), frequencies (with the use of filters), pitch and timing data. The audio envelope 210 may comprise one or more characteristics. For example, the audio envelope 210 may comprise an attack 211, a decay 212, a sustain 213, and a release 214. The attack 210 is the time taken for initial run-up of level from nil to peak. For example, the attack may indicate the initial phase of a voice input received from a user device of the one or more user devices. The decay 212 is the time taken for the subsequent run down from the attack level to the designated sustain level. For example, the decay may indicate a subsequent phase of the voice input wherein the voice input may decrease in energy towards a sustain level. The sustain 213 is the level during the main sequence of the sound's duration (e.g., the command) and may comprise the bulk the voice input. The release 214 is the time taken for the level to decay from the sustain level to zero and indicates the end of the audio. While FIG. 2A shows an approximation of an audio envelop 210, FIG. 2B shows an example of amplitude over time of an example audio envelope and FIG. 2C shows another approximation of an audio envelope 230, while FIG. 2D shows a close up of the release.

Figure 3A:
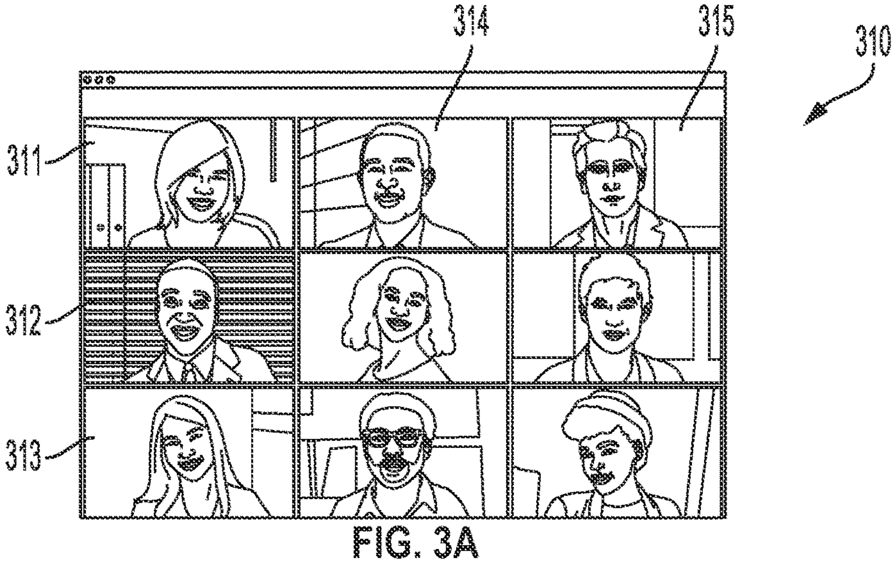
FIG. 3A-3C show example interfaces.

FIG. 3A shows an example user interface 310. The interface 310 may be associated with the one or more user devices. For example, the interface 310 may comprise one or more interface elements (e.g., interface elements 311-313). The one or more interface elements may be associated with one or more user devices. For example, each interface element of the one or more interface elements may be associated with a user device of the one or more user devices. For example, the interface element 311 may be associated with a first user device, the interface element 312 may be associated with a second user device, and the interface element 313 may be associated with a third user device. The one or more interface elements may be configured to display video data captured within one or more fields of view of the one or more user devices. For example, the interface may be configured to display one or more participants in the multi-device communication session (e.g., the video conference). The one or more interface elements may be configured to display additional information such as a user device identifier and/or a name associated with a user within the field of view of the user device.

Figure 3B:
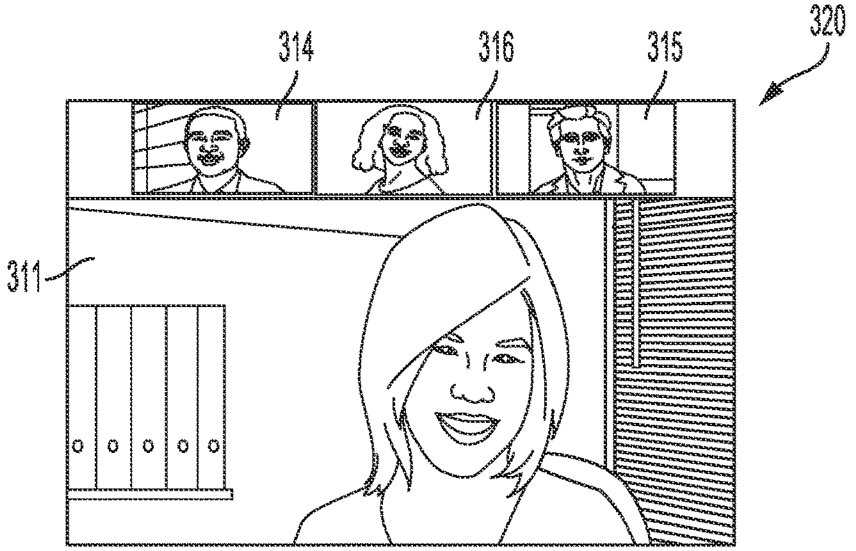

FIG. 3B shows an example interface 320 comprising interface elements 311, 314, 315, and 316. The interface 320 shows a scenario wherein the interface element 311 has been made larger. This may occur as a result of determining one or more activity levels associated with the one or more interface elements 311, 314, 315, and 316. For example, it may be determined that the activity level associated with interface element 311 does not satisfy a first activity threshold (e.g., the user associated with the interface element 311 is not participating very much in the video conference). Therefore, in order to encourage participation, the interface element 311 may be made larger.

Figure 3C:

Similarly, FIG. 3C shows an example interface 330 comprising interface elements 311, 314, 315, and 316. The interface 330 shows a scenario wherein the interface element 331 has been moved to a position of prominence (e.g., pulled forward) with respect to other interface elements. This may occur as a result of determining one or more activity levels associated with the one or more interface elements. For example, it may be determined that the activity level associated with interface element 331 does not satisfy a first activity threshold (e.g., the user associated with the interface element 331 is not participating very much in the video conference). Therefore, in order to encourage participation, the interface element 331 may be moved to a position of prominence.

Figure 4:
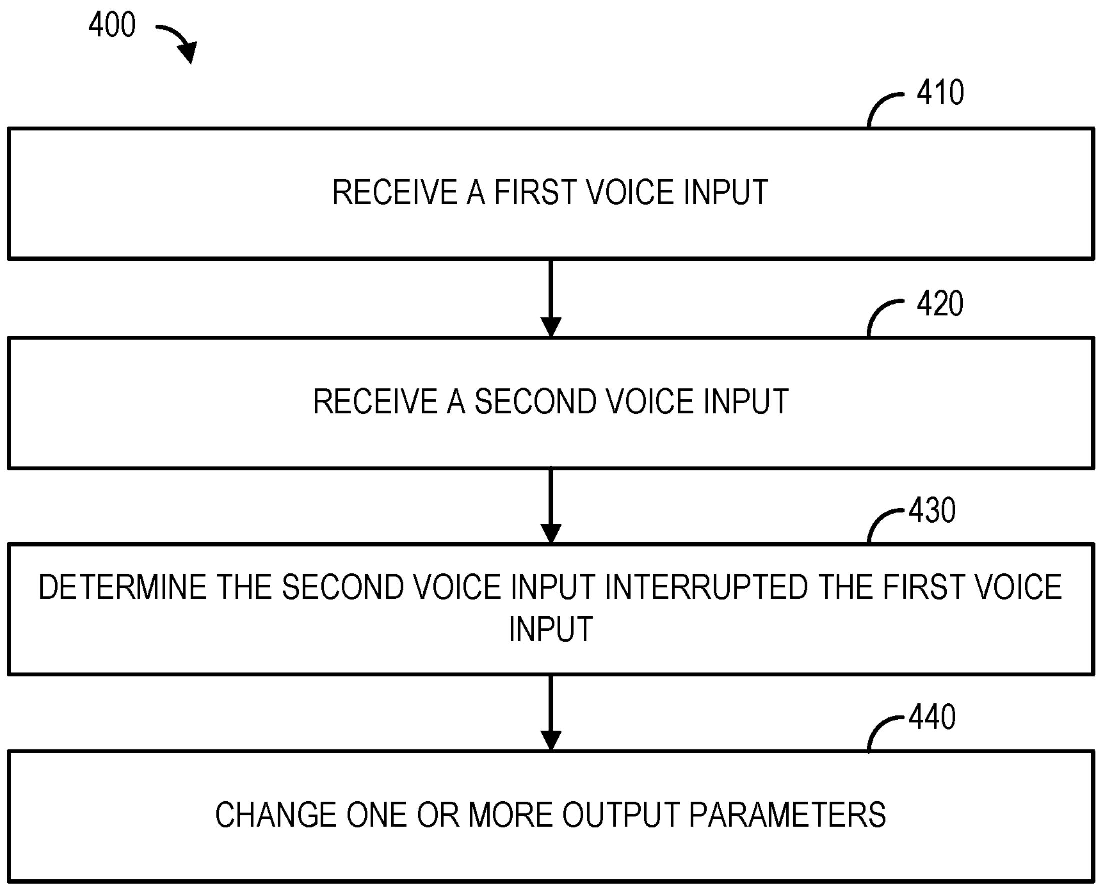
FIG. 4 is a flowchart of an example method.

FIG. 4 shows an example method 400, executing on one or more of the devices of FIG. 1. At 410, a multi-device communication session may be established. The multi-device communication session may comprise an online video conference. The online video conference may be associated with (e.g., carried out via) an interface comprising one or more interface elements. The interface may comprise, for example, a video conference interface and the one or more interface elements may comprise, for example, windows or panes or video thumbnails associated with one or more user devices participating in the multi-device communication session. For example, the one or more user devices may comprise a first user device and a second user device. The interface may comprise a first interface element displaying a video feed captured by the first user device and may also include a second user interface element displaying a video feed captured by the second user device.

The multi-device communication session may be hosted (e.g., carried out, facilitated by) an application such as a video conferencing application. The video conference application may configured to receive, send, store, generate, or otherwise process video data and audio data. For example, the conference application may receive one or more voice inputs and output one or more voice outputs. Similarly, the conference application may receive image data (e.g., still image data and/or video data) and output the received image data. The image data and audio data may be associated with timing data. For example, the image data may be associated with image timing data configured to indicate, for example, when image data was captured by an image capture device on the one or the user devices (e.g., a camera), when the image data was sent by the user device, and or when the image data was received by the conference application. Similarly, the audio data may be associated with audio timing data configured to indicate when a voice input (e.g., an utterance) was captured by an audio capture device (e.g., a microphone) on the user device, when the audio data was sent by the user device, or when the audio data was received by the conference application.

At 420, one or more voice inputs may be received. It may be determined that a second voice input was received during receipt and/or output of a first voice input. Determining the second voice input is received during the first voice input may comprise determining one or more voice input characteristics associated with the first voice input and the second voice input. Determining the one or more voice input characteristics of the first voice input and the second voice input may determining a first audio envelope associated with the first voice input and a second audio envelope associated with the second voice input. The first audio envelope and the second audio envelope may comprise audio data such as frequency, amplitude, timing data, and the like.

For example, the first audio envelope and the second audio envelope may be determined. For example, it may be determined that the second voice input began at a second time and that is after a first time associated with a beginning of the first voice input. For example, it may be determined that the second voice input began during the attack, decay, or sustain of the first audio envelope.

The interruption may be determined based on the timing data associated with either or both of the received voice inputs. For example, timing data associated with the second voice input may indicate the second voice input was received during receipt and/or output of the first received voice input.

At 430, it may be determined that the second voice input interrupted the first voice input. For example, the first voice input may be associated with first timing data and the second voice input may be associated with second timing data. The first timing data may indicate a time at which the first voice input began and/or a time at which the first voice input ended. The first timing data may be a clock time, a time since the conference call began, or a time relative to another voice input. The second timing data may indicate a time at which the second voice input began and/or a time at which the second voice input ended. The second timing data may be a clock time, a time since the conference call began, or a time relative to another voice input. Determining the second voice input interrupted the first voice input may comprise determining that the timing information associated with the second voice input indicates the second voice input was received during reception and/or output of the first voice input.

At 440, one or more one or more output parameters associated the one or more interface elements can be changed. For example, the one or more output parameters of a given interface element associated may be adjusted based on the second voice input occurring during the first voice input. Adjusting the one or more output parameters of an interface element associated with the second user device may comprise changing one or more of: a size associated with the interface element, color associated with the interface element, a position of the interface element, a border associated with the interface element or any other characteristic or quality of the interface element.

Figure 5:
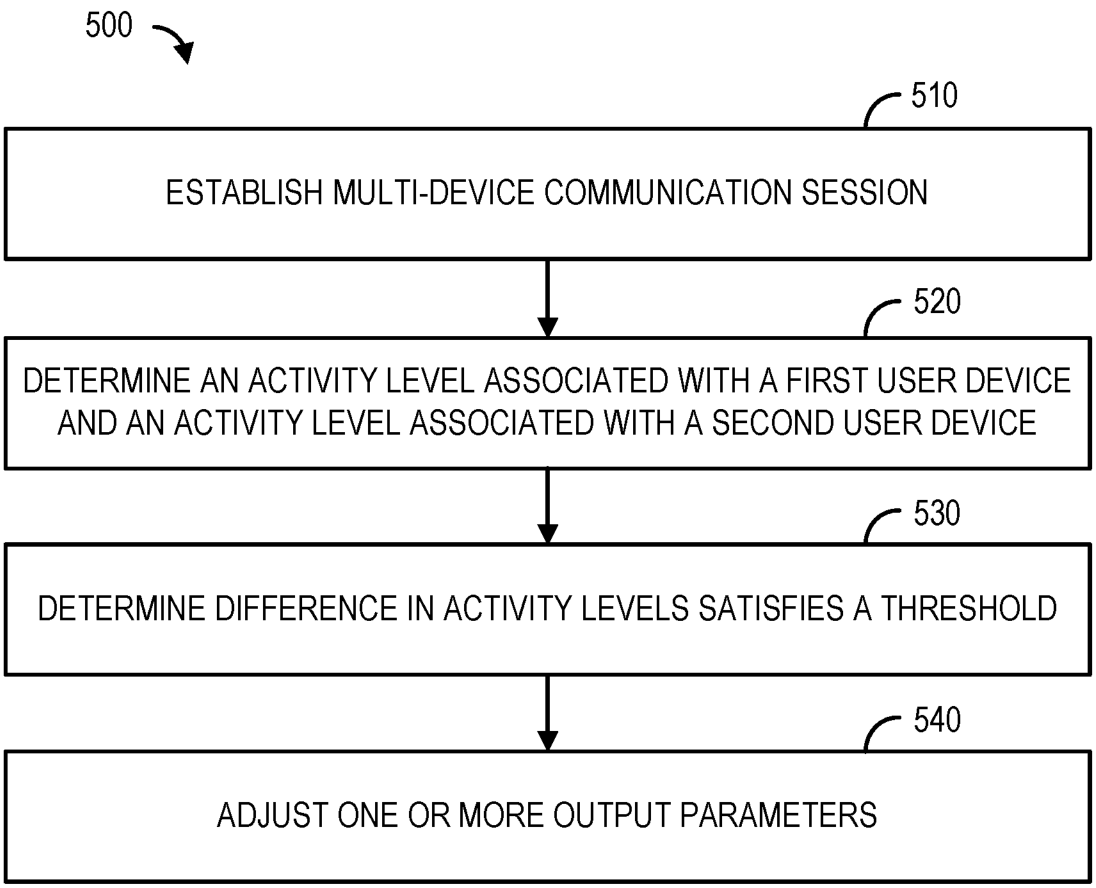
FIG. 5 is a flowchart of an example method.

For example, it may be determined that the second voice input interrupted the first voice input. An output parameter of the interface element associated with the second user device may be changed and/or adjusted to discourage participation. For example, the interface element associated with the second user device may positioned less prominently on the screen, reduced in size, or changed in some way so as to direct attention away from the second user interface element. Similarly, the interrupted user's interface element may be moved to a more prominent area of the interface (e.g., a central area), may be made larger, highlighted, or any other change that may direct attention back to the The method may further comprise determining an interruption event and sending, based on the interruption event, an alert. The method may comprise sending one or more messages. The one or more messages may comprise one or more notifications (and/or be configured to cause output of one or more notifications). For example, a message may be sent to the user device from which the interrupting voice input originated to alert the user the user has interrupted another user. Similarly, a message may be sent to the user that was interrupted identifying the interrupter. Change an FIG. 5 shows an example method 500, executing on one or more of the devices of FIG. 1. At 510, a multi-device communication session may be established. The multi-device communication session may comprise an online video conference. The online video conference may be associated with (e.g., carried out via) an interface comprising one or more interface elements. The interface may comprise, for example, a video conference interface and the one or more interface elements may comprise, for example, windows or panes or video thumbnails associated with one or more user devices participating in the multi-device communication session. For example, the one or more user devices may comprise a first user device and a second user device. The interface may comprise a first interface element displaying a video feed captured by the first user device and may also include a second user interface element displaying a video feed captured by the second user device.

At 520, an activity level associated with the first user device and an activity level associated with the second user device may be determined. The activity level associated with the first user device and the activity level associated with the second user device comprise one or more of: a visual activity level or an audio activity level.

At 530, a difference may be determined between the first activity level and the second activity level. For example, it may be determined that the first activity level indicates a first user is speaking 60% of the time of a conference call while the second activity level indicates a second user is only speaking 10% of the time of the conference call. It may be determined that a difference between the first activity level and the second activity level satisfies a threshold. The threshold may comprise any percentage, ratio, number, combination thereof, or the like. For example, it may be determined that the difference in percentage of time spent speaking satisfies a threshold. For example, it may be determined that the first user is dominating the conference call at the expense of other users.

At 540, one or more output parameters of an interface element associated with either or both of the first interface element associated with the first user device and/or a second interface element associated with the second user device may be adjusted. The one or more output parameters of a given interface element associated may be adjusted based on the either or both of the first activity level associated with the first user device or the second activity level associated with the second user device. The one or more output parameters may be adjusted based on a difference between the first activity level and the second activity level. For example, the difference between the first activity level and the second activity level may satisfy a threshold.

Adjusting the one or more output parameters of an interface element associated with the second user device may comprise changing one or more of: a size associated with the interface element, color associated with the interface element, a position of the interface element, a border associated with the interface element or any other characteristic or quality of the interface element.

For example, it may be determined that the first activity level does not satisfy a first activity level threshold. For example, a first user associated with the first user device may not be participating in the multi-device communication session (e.g., the user is not speaking or otherwise participating). An output parameter of the interface element associated with the first user device may be adjusted to encourage participation. For example, the interface element associated with the first user device may positioned prominently on the screen, enlarged, or changed in some way so as to direct attention to the first user interface element.

For example, it may be determined that the second activity level exceeds a second activity level threshold. For example, a second user associated with the second user device may be dominating in the multi-device communication session (e.g., the user is speaking a disproportionate amount of time). An output parameter of the interface element associated with the second user device may be adjusted to discourage participation. For example, the interface element associated with the second user device may positioned less prominently on the screen, reduced in size, or changed in some way so as to direct attention away from the second user interface element.

The method may further comprise determining an interruption event and sending, based on the interruption event, an alert.

Figure 6:
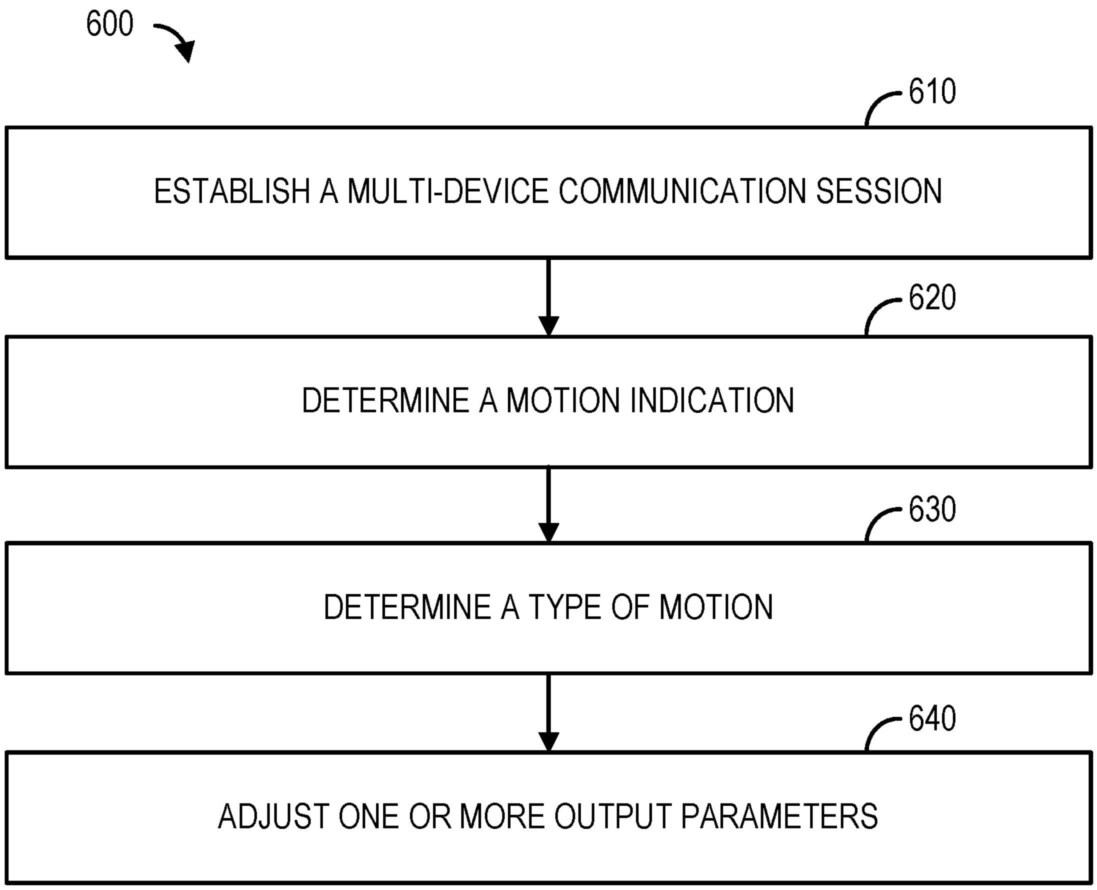
FIG. 6 is a flowchart of an example method.

FIG. 6 shows an example method 600, executing on one or more of the devices of FIG. 1. At 610, a multi-device communication session may be established. The multi-device communication session may comprise an online video conference. The online video conference may be associated with (e.g., carried out via) an interface comprising one or more interface elements. The interface may comprise, for example, a video conference interface and the one or more interface elements may comprise, for example, windows or panes or video thumbnails associated with one or more user devices participating in the multi-device communication session. For example, the one or more user devices may comprise a first user device and a second user device. The interface may comprise a first interface element displaying a video feed captured by the first user device and may also include a second user interface element displaying a video feed captured by the second user device.

At 620, a motion indication in the video content associated with the second user device may be determined. Determining the motion indication in the video content associated with the second user device may comprise detecting a user motion in the field of view of an image capture component of the second user device. For example, the computing device may compare one or more frames of content of the video content. For example, the computing device may compare a first frame of content of the one or more frames of content and a second frame of content of the one or more frames of content and determine, based on a difference between the first frame and the second frame, the motion indication. The computing device may use common motion detection techniques including, for example, a pixel-by-pixel comparison of the first frame and the second frame to determine a number of pixels whose luminance or chrominance value changed between the two frames. The computing device may associate one or more areas of the field of view with one or more variable sensitivity settings. For example, the computing device may ignore movements in the background of the video but may increase sensitivity to user movements (e.g., the foreground, in and around the face and body of the user, etc.).

At 630, a type of motion in the video content may be determined. For example, the analysis module 105 may determine, based on pattern recognition, facial detection, facial recognition, pixel analysis, combinations thereof, and the like. For example, an activity event may comprise a motion indication indicative of a user motion within a field of view of a user device. For example, the motion indication may be determined by comparing one or more frames of video and determining, based on pixel comparison, a motion between two or more frames of video of the one or more frames of video. For example, the first motion event may be a user waving his or her hands. For example the motion event may be a user entering or exiting a field of view of a given image capture device. For example, a motion event may comprise a user nodding his head, shaking his head, or any other motion. Any of the one or more motion events (e.g., the first motion event and/or the second motion event) may be compared to a motion threshold.

At 640, one or more output parameters of an interface element associated with the second user device may be adjusted. The one or more output parameters of an interface element associated with the second user device may be adjusted based on the motion indication. Adjusting the one or more output parameters of an interface element associated with the second user device may comprise changing one or more of: a size associated with the interface element, color associated with the interface element, a position of the interface element, a border associated with the interface element or any other characteristic or quality of the interface element. For example, the activity analysis module 105 may determine, based on the type of motion event, an adjustment to the one or more output parameters associated with the one or more interface elements. For example, a hand waving may cause an interface element to be highlighted or positioned more prominently. For example, a user entering a field of view of an image capture device may cause an interface element to be repositioned to a prominent area of a display (e.g., a central portion as opposed to a peripheral or boundary portion). Similarly, a user entering the field of view or waving his hand may cause the interface element to be resized to a larger size. For example, a user exiting the field of view may cause the user interface element to be repositioned to a less prominent area of the display. Similarly, the user exiting the The method may further comprise determining the motion indication does not satisfy a motion threshold and informing the motion indication (e.g., taking no action based on the motion indication).

Figure 7:
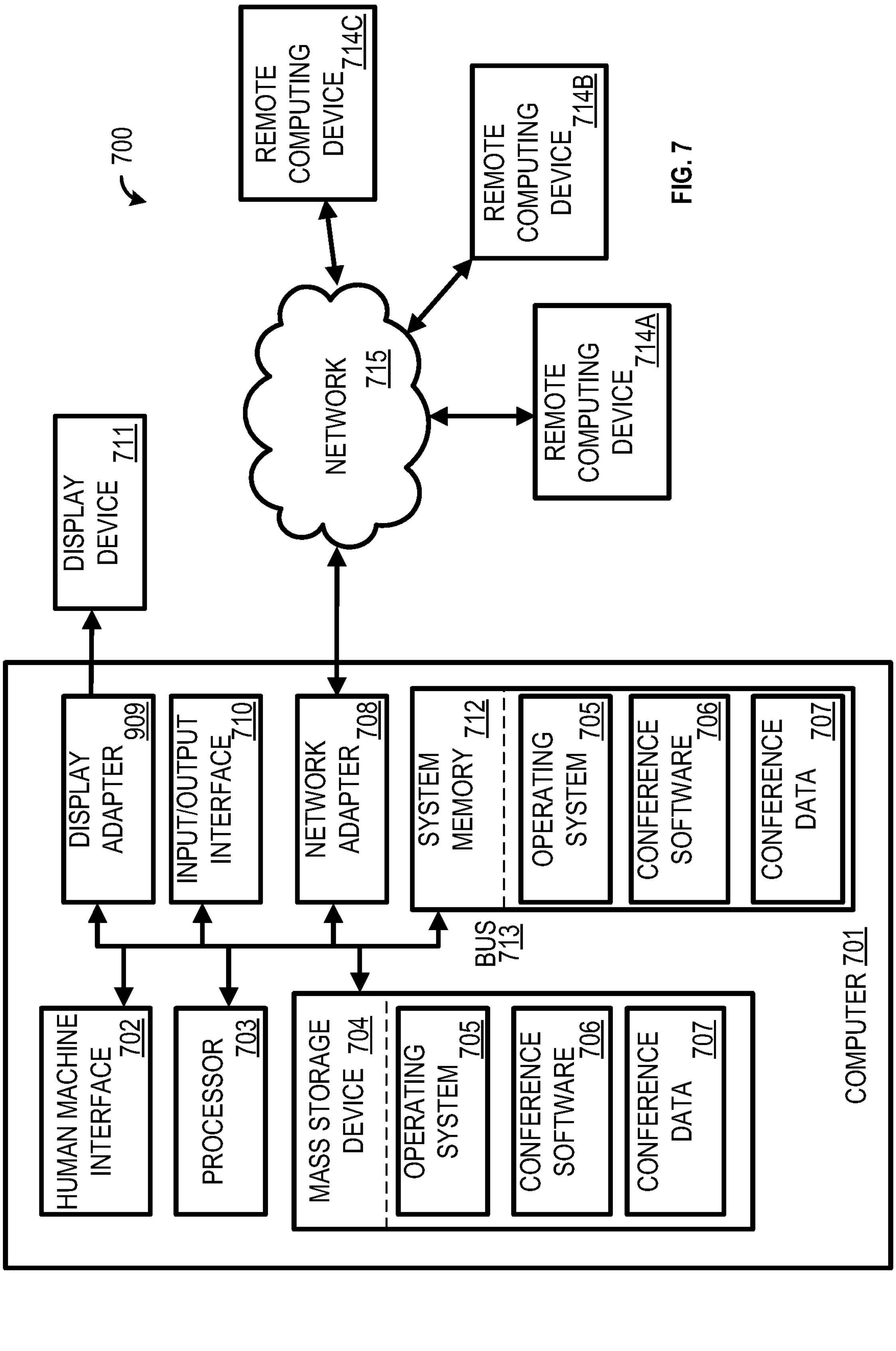
FIG. 7 is a block diagram of an example computing device.

The above described disclosure may be implemented on a computer 701 as illustrated in FIG. 7 and described below. FIG. 7 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Examples comprise set top boxes, programmable consumer electronics, network PCs, minicomputers, mainframe computers, distributed computing environments that comprise any of the above systems or devices, and the like.

The processing of the disclosed can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, conference software 706, conference data 707, a network adapter 708, the system memory 712, an Input/Output Interface 710, a display adapter 709, a display device 711, and a human machine interface 702, can be contained within one or more remote computing devices 714A. 714B.

714C at physically separate locations, connected through buses of this form, in effect implementing a fully distributed system.

The computer 701 typically comprises a variety of computer readable media. Example readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the conference data 707 and/or program modules such as the operating system 705 and the conference software 706 that are immediately accessible to and/or are presently operated on by the one or more processors 703.

The computer 701 can also comprise other removable/non-removable, volatile/non-volatile computer storage media. By way of example, FIG. 7 illustrates the mass storage device 704 which can facilitate non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the conference software 706. Each of the operating system 705 and the conference software 706 (or some combination thereof) can comprise elements of the programming and the computing task software 706. The conference data 707 can also be stored on the mass storage device 704. The conference data 707 can be stored in any of one or more databases known in the art. Examples of such databases comprise, DB2®, Microsoft® Access, Microsoft® SQL Server, Oracle®, mySQL, PostgreSQL, Mongo, Cassandra, or any SQL, non-SQL, in-memory data structure store, distributed data structure store, key-value database, combinations thereof, and the like. The databases can be centralized or distributed across multiple systems.

The user or device can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

The display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), an augmented reality (AR) display, a virtual reality (VR) display, a projector, combinations thereof, and the like. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714A. 714B, 714C. By way of example, a remote computing device can be a gaming system, personal computer, portable computer, smartphone, a server, a router, a network computer, a peer device or other common network node, and so on. Logical connections between the computer 701 and a remote computing device 714A, 714B. 714C can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the conference software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The disclosure can employ Artificial Intelligence techniques such as machine learning and iterative learning. Examples of such techniques include, but are not limited to, expert systems, case based reasoning. Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the disclosure has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as an example only, with a true scope and spirit being indicated by the following claims.

The invention claimed is:

1. A method comprising:

receiving a first voice input associated with a first user device participating in a multi-device communication session;

receiving, during the first voice input associated with the first user device, a second voice input associated with a second user device participating in the multi-device communication session;

determining, based on overlapping timing data associated with the first voice input and the second voice input, that the second voice input interrupted the first voice input; and based on the second voice input interrupting the first voice input, changing, for an interface associated with the multi-device communication session, one or more output parameters of an interface element associated with one or more of the first user device or the second user device.

2. The method of claim 1, wherein the first voice input comprises a first spoken voice input associated with the first user device and wherein the second voice input comprises a second spoken voice input associated with the second user device.

3. The method of claim 1, wherein the multi-device communication session comprises an online video conference and wherein the interface element comprises a user pane associated with the online video conference.

4. The method of claim 1, wherein adjusting the one or more output parameters comprises changing one or more of: a size of the interface element, a border associated with the interface element, or a position of the interface element.

5. The method of claim 1, further comprising determining, based on the second voice input, an interruption event.

6. The method of claim 1, further comprising sending, based on an interruption event, an alert.

7. The method of claim 1, further comprising determining, based on one or more of: the first voice input or the second voice input, at least one audio envelope.

8. The method of claim 1, further comprising:

receiving, from the first user device, a deferral indication;

determining one or more output parameters associated with a second interface element; and causing, based on the deferral indication, a change in at least one output parameter of the one or more output parameters.

9. An apparatus comprising:

one or more processors; and memory storing processor-executable instructions that, when executed by the one or more processors, cause the one or more processors to:

receive a first voice input associated with a first user device participating in a multi-device communication session;

receive, during the first voice input associated with the first user device, a second voice input associated with a second user device participating in the multi-device communication session;

determine, based on overlapping timing data associated with the first voice input and the second voice input, that the second voice input interrupted the first voice input; and based on the second voice input interrupting the first voice input, change, for an interface associated with the multi-device communication session, one or more output parameters of an interface element associated with one or more of the first user device or the second user device.

10. The apparatus of claim 9, wherein the first voice input comprises a first spoken voice input associated with the first user device and wherein the second voice input comprises a second spoken voice input associated with the second user device.

11. The apparatus of claim 9, wherein the multi-device communication session comprises an online video conference and wherein the interface element comprises a user pane associated with the online video conference.

12. The apparatus of claim 9, wherein the processor-executable instructions that, when executed by the one or more processors, cause the one or more processors to change the one or more output parameters, further cause the one or more processors to change one or more of: a size of the interface element, a border associated with the interface element, or a position of the interface element.

13. The apparatus of claim 9, wherein the processor-executable instructions, when executed by the one or more processors, further cause the one or more processors to determine, based on the second voice input, an interruption event.

14. The apparatus of claim 9, wherein the processor-executable instructions, when executed by the one or more processors, further cause the one or more processors to send, based on an interruption event, an alert.

15. The apparatus of claim 9, wherein the processor-executable instructions, when executed by the one or more processors, further cause the one or more processors to determine, based on one or more of: the first voice input or the second voice input, at least one audio envelope.

16. A system comprising:

a computing device configured to:

receive a first voice input associated with a first user device participating in a multi-device communication session;

receive, during the first voice input associated with the first user device, a second voice input associated with a second user device participating in the multi-device communication session;

determine, based on overlapping timing data associated with the first voice input and the second voice input, that the second voice input interrupted the first voice input;

based on the second voice input interrupting the first voice input, change, for an interface associated with the multi-device communication session, one or more output parameters of an interface element associated with one or more of the first user device or the second user device; and the first user device configured to:

output the interface element.

17. The system of claim 16, wherein the first voice input comprises a first spoken voice input associated with the first user device and wherein the second voice input comprises a second spoken voice input associated with the second user device.

18. The system of claim 16, wherein the multi-device communication session comprises an online video conference and wherein the interface element comprises a user pane associated with the online video conference.

19. The system of claim 16, wherein the computing device is further configured to determine, based on the second voice input, an interruption event.

20. The system of claim 16, wherein the computing device is further configured to determine, based on one or more of: the first voice input or the second voice input, at least one audio envelope.

* * * * *